US012224142B2

(12) United States Patent
Nakamura et al.

(10) Patent No.: US 12,224,142 B2
(45) Date of Patent: Feb. 11, 2025

(54) BREAKER DEVICE

(71) Applicant: Panasonic Intellectual Property Management Co., Ltd., Osaka (JP)

(72) Inventors: Masato Nakamura, Hyogo (JP); Shun Ito, Hyogo (JP); Shinya Kimoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/701,878

(22) PCT Filed: Jul. 27, 2023

(86) PCT No.: PCT/JP2023/027522
§ 371 (c)(1),
(2) Date: Apr. 16, 2024

(87) PCT Pub. No.: WO2024/134956
PCT Pub. Date: Jun. 27, 2024

(65) Prior Publication Data

US 2024/0371589 A1 Nov. 7, 2024

(30) Foreign Application Priority Data

Dec. 23, 2022 (JP) ................................ 2022-206460

(51) Int. Cl.
*H01H 71/10* (2006.01)
*H01H 71/02* (2006.01)

(52) U.S. Cl.
CPC ............ *H01H 71/10* (2013.01); *H01H 71/02* (2013.01)

(58) Field of Classification Search
CPC ................................ H01H 71/10; H01H 71/02
(Continued)

(56) References Cited

U.S. PATENT DOCUMENTS 3,873,786 A * 3/1975 Lagofun .............. H01H 39/006 200/61.08
4,224,487 A * 9/1980 Simonsen ............ H01H 39/006 200/61.08

(Continued)

FOREIGN PATENT DOCUMENTS

JP 2020-502772 A 1/2020
JP 2022-526315 A 5/2022

(Continued)

OTHER PUBLICATIONS

International Search Report dated Sep. 12, 2023 issued in International Patent Application No. PCT/JP2023/027522.

(Continued)

*Primary Examiner* — Anatoly Vortman
(74) *Attorney, Agent, or Firm* — Rimon P.C.

(57) ABSTRACT

This breaker device includes: a casing; an igniter configured to generate gas; a pusher located inside the casing and positioned below the igniter; a conductor including a separating portion positioned below the pusher; and an elastic member disposed to be positioned between the casing and the pusher to press the outer side surface of the pusher. In the state where the pusher is stationary after the pusher moves the separating portion downward under the pressure of the gas generated by the igniter, the pusher is located at a level below the elastic member, and the inner surface of the elastic member overlaps the pusher as viewed from above.

14 Claims, 10 Drawing Sheets

(58) Field of Classification Search
USPC .......................................................... 337/114
See application file for complete search history.

(56) References Cited

U.S. PATENT DOCUMENTS

| | | | | |
|---|---|---|---|---|
| 4,417,519 | A * | 11/1983 | Lutz | F42C 19/06 200/61.08 |
| 6,194,988 | B1 * | 2/2001 | Yamaguchi | H01H 39/006 200/61.08 |
| 6,556,119 | B1 * | 4/2003 | Lell | H01H 37/323 337/182 |
| 7,123,124 | B2 * | 10/2006 | Caruso | H01H 39/006 200/61.08 |
| 7,205,879 | B2 * | 4/2007 | Kordel | H01H 39/006 337/401 |
| 7,239,225 | B2 * | 7/2007 | Tirmizi | H01H 39/006 337/30 |
| 7,557,688 | B2 * | 7/2009 | Von Behr | H01H 39/006 361/115 |
| 7,745,745 | B2 * | 6/2010 | Kordel | F42B 3/006 200/61.08 |
| 8,653,386 | B2 * | 2/2014 | Ukon | B23D 15/145 200/61.08 |
| 9,153,402 | B2 * | 10/2015 | Ukon | H01H 39/006 |
| 9,324,522 | B2 * | 4/2016 | Nakamura | H01H 39/006 |
| 10,012,245 | B2 * | 7/2018 | Nadeau | F42B 3/26 |
| 10,128,074 | B2 * | 11/2018 | Lorenzon | H01H 71/025 |
| 10,418,212 | B2 * | 9/2019 | Warenits | H01H 9/32 |
| 10,468,216 | B2 * | 11/2019 | Marlin | H01H 39/006 |
| 10,714,276 | B2 * | 7/2020 | Moszynski | H01H 39/006 |
| 11,823,854 | B2 * | 11/2023 | Marlin | H01H 39/006 |
| 2004/0221638 | A1 * | 11/2004 | Brede | B23D 15/145 72/326 |
| 2006/0145808 | A1 * | 7/2006 | Von Behr | H01H 39/006 337/401 |
| 2010/0218659 | A1 * | 9/2010 | Ukon | H01H 39/006 83/639.1 |
| 2019/0393008 | A1 | 12/2019 | Lopez et al. | |
| 2021/0350991 | A1 * | 11/2021 | Fukuda | H01H 39/006 |

FOREIGN PATENT DOCUMENTS

| | | | |
|---|---|---|---|
| WO | 2019/054262 | A1 | 3/2019 |
| WO | 2022/209250 | A1 | 10/2022 |

OTHER PUBLICATIONS

Decision to Grant a Patent dated Dec. 12, 2023 issued in Japanese Patent Application No. 2023-566568, with English machine translation.

* cited by examiner

BREAKER DEVICE

This application is the U.S. National Phase under 35 U.S.C. § 371 of International Patent Application No. PCT/JP2023/027522, filed on Jul. 27, 2023, which in turn claims the benefit of Japanese Patent Application No. 2022-206460, filed on Dec. 23, 2022, the entire disclosures of which Applications are incorporated by reference herein.

TECHNICAL FIELD

The present disclosure relates to breaker devices.

BACKGROUND ART

There are conventionally known breaker devices that, when in use, are connected to an electrical circuit. Among such breaker devices, a breaker device has been disclosed that includes: a body (a casing); and a piston (a pusher) disposed in the body and including a sealing gasket (an elastic member) made of an elastically deformable material that is carried on a side wall of the body inside the body (in a groove) (refer to Patent Literature (PTL) 1).

Citation List

Patent Literature

PTL 1: Unexamined Japanese Patent Publication (Japanese Translation of PCT Publication) No. 2020-502772

SUMMARY OF INVENTION

However, in the breaker device disclosed in PTL 1, a groove is formed in the pusher and therefore, the pusher has reduced strength and there is a risk that when an electric arc is interrupted, soot may accumulate in the groove of the pusher and cause insulation deterioration.

Thus, the present disclosure provides a breaker device capable of exhibiting improved insulation performance with a pusher having increased strength compared to existing breaker devices.

A breaker device according to one aspect of the present disclosure includes: a casing; an igniter configured to generate gas; a pusher located inside the casing and positioned below the igniter; a conductor including a separating portion positioned below the pusher; and an elastic member disposed to be positioned between the casing and the pusher to press an outer side surface of the pusher. In a state where the pusher is stationary after the pusher moves the separating portion downward under a pressure of the gas generated by the igniter, the pusher is located at a level below the elastic member, and an inner surface of the elastic member overlaps the pusher as viewed from above.

ADVANTAGEOUS EFFECTS OF INVENTION

According to one aspect of the present disclosure, it is possible to provide a breaker device capable of exhibiting improved insulation performance with a pusher having increased strength compared to existing breaker devices.

DESCRIPTION OF EMBODIMENTS

Circumstances Leading to the Present Disclosure

Figure 1A:
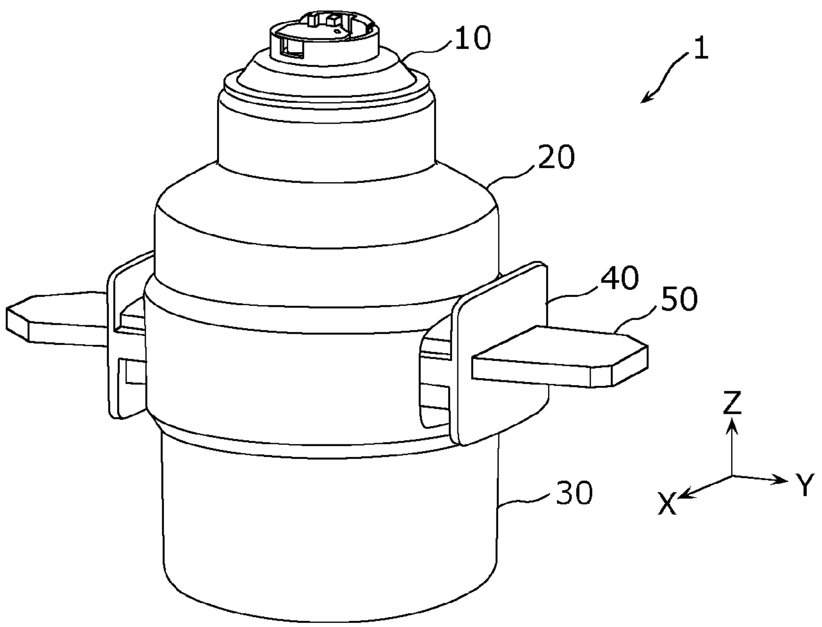
FIG. 1A is a first perspective view illustrating a breaker device according to an exemplary embodiment.

Prior to the description of exemplary embodiments, etc., according to the present disclosure, the circumstances leading to the present disclosure will be described below.

In a breaker device such as that disclosed in PTL 1, the pusher is driven by receiving the force of the igniter (the pressure of the gas), and thus it is preferable that the pusher have high strength. However, in the breaker device disclosed in PTL 1, a groove for accommodating the elastic member is formed on the outer side surface of the pusher, and therefore the strength of the pusher is reduced due to the groove. Furthermore, in the breaker device disclosed in PTL 1, when an electric arc is interrupted, electrically conductive soot accumulates in the groove, and there is a risk that said soot may form a path that causes insulation deterioration. For example, during the interrupting operation, the groove formed in the pusher may approach an electric arc generation position, and soot may accumulate in the groove and form a path that causes insulation deterioration. Thus, there is room for improvement with the strength of the pusher and the insulation performance of the breaker device disclosed in PTL 1.

Furthermore, it is preferable that after a portion (the separating portion) of the conductor is cut off by the pusher moving downward under the force of the igniter, the conductor be kept from passing an electric current again as a result of the pusher moving up to the original position. In other words, it is preferable that the conductor with the separating portion cut off remain insulated.

In view of this, the inventors of the present invention have diligently examined a breaker device that exhibits improved insulation performance with a pusher having increased strength, and conceived of the breaker device described below.

A breaker device according to one aspect of the present disclosure includes: a casing; an igniter configured to generate gas; a pusher located inside the casing and positioned below the igniter; a conductor including a separating portion positioned below the pusher; and an elastic member disposed to be positioned between the casing and the pusher to press an outer side surface of the pusher. In a state where the pusher is stationary after the pusher moves the separating portion downward under a pressure of the gas generated by the igniter, the pusher is located at a level below the elastic member, and an inner surface of the elastic member overlaps the pusher as viewed from above.

Thus, the elastic member presses the outer side surface of the pusher, in other words, the pusher is pressed from the outside of the pusher as the breaker device is viewed from above, and therefore a groove for accommodating the elastic member does not need to be formed on the outer side surface of the pusher in the breaker device. Furthermore, in the state where the pusher is stationary after the pusher moves the separating portion downward, the elastic member can come into contact with the pusher moving up to the original position and thereby keep the pusher from moving up to the original position. This means that the elastic member can keep the conductor from passing an electric current again through the separating portion as a result of the pusher moving up to the original position. Thus, according to the present disclosure, it is possible to provide a breaker device capable of exhibiting improved insulation performance with a pusher having increased strength compared to existing breaker devices.

Furthermore, for example, it is preferable that in a state where the pusher is stationary after the pusher cuts off the separating portion under the pressure of the gas generated by the igniter, an upper end of the pusher be located at a level below an upper end of the elastic member and a lower end of the pusher be located at a level below a lower end of the elastic member.

Thus, in the state where the pusher is stationary after the pusher cuts off the separating portion, the pusher is located at a level below the upper end of the elastic member, allowing the elastic member to keep the pusher from moving up to the original position.

Furthermore, for example, it is preferable that in the state where the pusher is stationary after the pusher cuts off the separating portion under the pressure of the gas generated by the igniter, the upper end of the pusher be located at a level below the lower end of the elastic member.

Thus, in the state where the pusher is stationary after the pusher cuts off the separating portion, the elastic member can come into contact with the pusher moving up to the original position and thereby keep the pusher from moving up to the original position.

Furthermore, for example, it is preferable that the breaker device further include a resin member located inside the casing and positioned between the casing and the pusher and the elastic member be in contact with the casing, the pusher, and the resin member.

Thus, when the elastic member contacts the casing, the pusher, and the resin member, the elastic member can be held inside the casing without a groove on the pusher.

Furthermore, for example, it is preferable that the breaker device further include a resin member located inside the casing and positioned between the casing and the pusher and the elastic member be pressed against the casing, the pusher, and the resin member.

Thus, the elastic member is pressed against the casing, the pusher, and the resin member, making it possible to more reliably reduce the leakage of the gas generated by the igniter from the internal space of a recess into the space outside of said internal space.

Furthermore, for example, it is preferable that in a state where the pusher is stationary after the pusher cuts off the separating portion under the pressure of the gas generated by the igniter, the elastic member be held on the casing and the resin member.

Thus, the breaker device according to the present disclosure can keep the elastic member from falling off in the state where the pusher is stationary after the pusher cuts off the separating portion. Accordingly, the elastic member can more reliably keep the conductor from passing an electric current again.

Furthermore, for example, it is preferable that the casing include a bent portion and the bent portion be in contact with the elastic member.

Thus, when the bent portion of the casing is configured to contact the elastic member, the casing can be further reduced in size.

Furthermore, for example, it is preferable that in a state where the pusher is stationary after the pusher cuts off the separating portion under the pressure of the gas generated by the igniter, the pusher do not include a groove or a step extending along an outer periphery of the pusher, at a level above a surface of the conductor along which the separating portion has been cut off.

For example, if the pusher includes a groove or a step extending along the outer periphery, there is a risk that in the state where the pusher is stationary after the pusher cuts off the separating portion, the conductor may pass an electric current again via soot accumulating in said groove or step. In contrast, in the breaker device according to the present disclosure, since the pusher does not include a groove or a step extending along the outer periphery, the conductor can be kept from passing an electric current again in the state where the pusher is stationary after the pusher cuts off the separating portion.

Furthermore, for example, it is preferable that a side wall of the pusher contact the elastic member and do not include a groove extending along an outer periphery of the pusher.

Thus, the breaker device according to the present disclosure does not include a groove or a step extending along the outer periphery of the pusher, and therefore a reduction in the strength of the pusher due to said groove or step can be prevented. In other words, in the breaker device according to the present disclosure, the pusher has increased strength compared to a pusher including a groove such as that disclosed in PTL 1.

Furthermore, for example, it is preferable that the elastic member be ring-shaped.

Thus, the elastic member can contact the outer side surface of the pusher throughout the entire circumference in the circumferential direction, making it possible to more reliably reduce the leakage of the gas generated by the igniter from the internal space of the recess into the space outside of said internal space.

Furthermore, for example, it is preferable that the elastic member be disposed along the outer side surface of the pusher.

Thus, even when the shape of the pusher is changed, the elastic member can reduce the leakage of the gas generated by the igniter from the internal space of the recess into the space outside of said internal space.

Furthermore, for example, the elastic member may be disposed to be pressed against the casing.

Furthermore, for example, the pusher may be configured to cut off the separating portion and move the separating portion downward under the pressure of the gas generated by the igniter. Hereinafter, an exemplary embodiment, etc., will be specifically described with reference to the drawings.

Note that each exemplary embodiment, etc., described below shows a general or specific example. The numerical values, shapes, structural elements, the arrangement and connection of the structural elements, steps (manufacturing steps), the processing order of the steps (manufacturing steps), etc., shown in the following exemplary embodiment, etc., are mere examples, and are not intended to limit the present disclosure. Therefore, among the structural elements in the following exemplary embodiment, structural elements not recited in any one of the independent claims are described as optional structural elements.

Note that the figures are schematic diagrams and are not necessarily precise illustrations. Therefore, for example, scale reduction and the like in the figures are not necessarily the same. Furthermore, in the figures, substantially identical elements are assigned the same reference signs, and overlapping description will be omitted or simplified.

In the present specification and the drawings, the X axis, the Y axis, and the Z axis represent three axes of the right-handed three-dimensional Cartesian coordinate system. In the exemplary embodiment, etc., the Z-axis direction is a direction of movement of the pusher. In the present specification, the phrase "as viewed from above" indicates viewing from the positive side of the Z-axis to the negative side of the Z-axis, the phrase "in a cross-sectional view" indicates viewing a cut surface of the breaker device that has been cut through by a plane extending through the Z-axis and parallel to the Z-axis, and the term "lateral" indicates a direction orthogonal to the Z-axis direction. In the present specification, the Z-axis direction is also referred to as an up-down direction. The up-down direction of the breaker device in the present specification merely indicates relative positioning of elements included in the breaker device for the sake of description of the exemplary embodiment, etc. For example, in the present specification, the terms "up/upward/above/top" and "down/downward/below/bottom" do not indicate an upward direction (vertically upward) or a downward direction (vertical downward) in a sense of absolute space, but are used as terms defined by relative positioning on the basis of the direction of movement of the pusher. The posture of the breaker device when installed is not limited by the directions illustrated in the drawings.

Furthermore, in the present specification, terms indicating the relationship between elements such as being equal and parallel, terms indicating the shapes of elements such as a circle and a trapezoid, numerical values, and numerical ranges are not expressions referring to only exact meanings, but are expressions referring to substantially equivalent ranges including, for example, approximately a few percent (or approximately 10%) differences.

Furthermore, in the present specification, ordinal numbers such as "first" and "second" do not indicate the number of structural elements or the sequence of structural elements, but are used for the purpose of avoiding confusion and distinguishing between structural elements of the same kind, unless otherwise noted.

EXAMPLARY EMBODIMENT

Hereinafter, the breaker device according to the present exemplary embodiment will be described with reference to FIG. 1A to FIG. 6B.

1-1. Configuration of Breaker Device

Figure 1B:
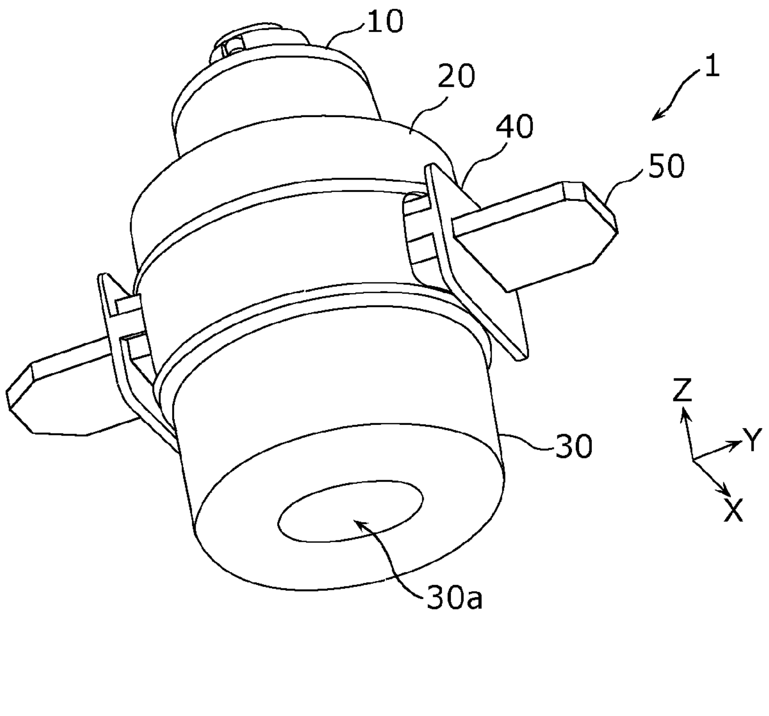
FIG. 1B is a second perspective view illustrating a breaker device according to an exemplary embodiment.
Figure 2:
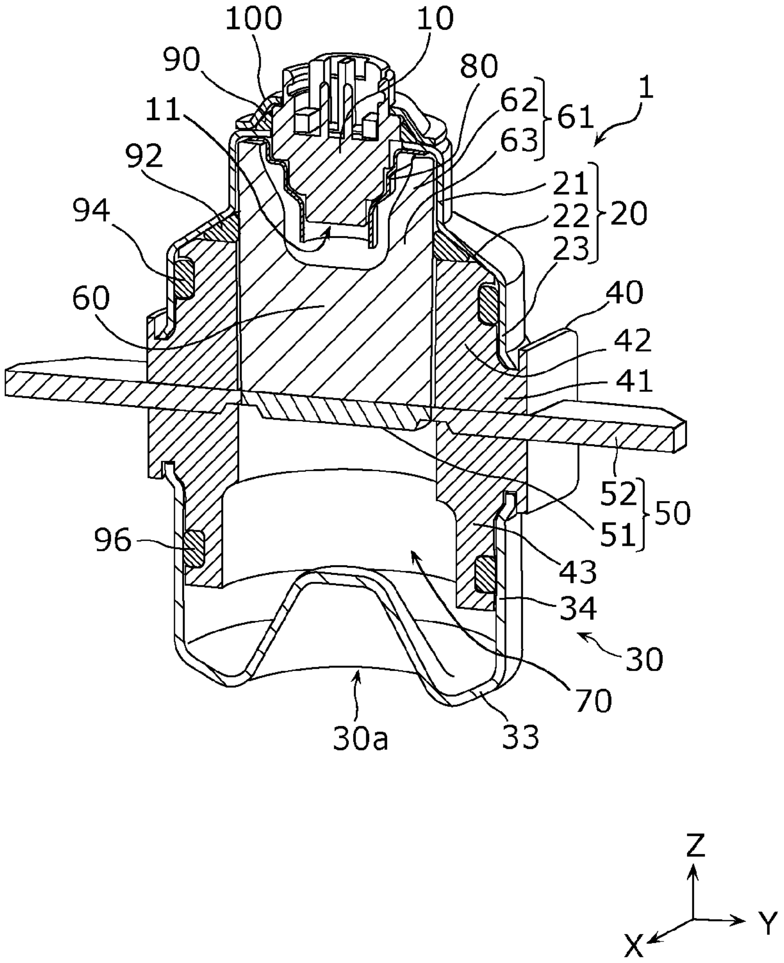
FIG. 2 is a cross-sectional perspective view illustrating a breaker device according to an exemplary embodiment.
Figure 3:
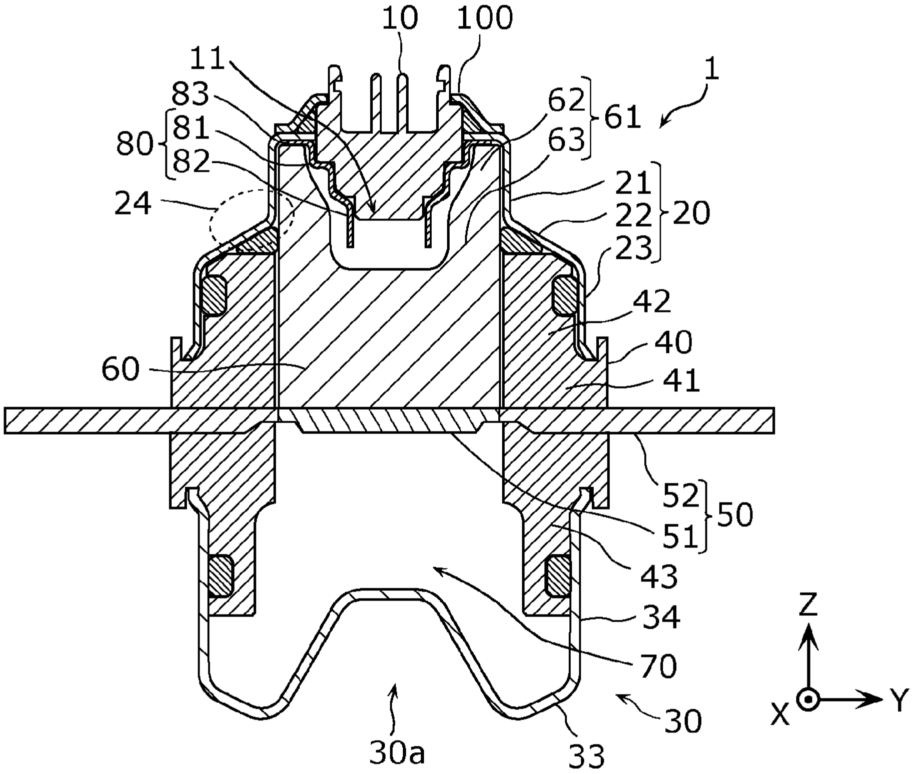
FIG. 3 is a cross-sectional view illustrating a breaker device according to an exemplary embodiment.

First, the breaker device according to the present exemplary embodiment will be described with reference to FIG. 1A to FIG. 4C. FIG. 1A is a first perspective view illustrating breaker device 1 according to the present exemplary embodiment. FIG. 1B is a second perspective view illustrating breaker device 1 according to the present exemplary embodiment. FIG. 2 is a cross-sectional perspective view illustrating breaker device 1 according to the present exemplary embodiment. FIG. 3 is a cross-sectional view illustrating breaker device 1 according to the present exemplary embodiment.

FIG. 1A illustrates breaker device 1 that has rotated around the Z axis as an axis of rotation from the state thereof in a front view, assuming that a view projected in the X-axis direction is a front view, and FIG. 1B illustrates breaker device 1 as viewed obliquely from below. FIG. 2 is a perspective view illustrating a cross section of breaker device 1 (in the initial state) during a non-interrupting operation when taken along the YZ plane, and FIG. 3 is a front view illustrating a cross section of breaker device 1 (in the initial state) during a non-interrupting operation when taken along the YZ plane.

As illustrated in FIG. 1A to FIG. 3, breaker device 1 includes igniter 10, upper casing 20, lower casing 30, resin member 40, conductor 50, pusher 60, protective portion 80, and elastic members 90, 92, 94, 96. Breaker device 1 is a device that is mounted on an object including an electrical circuit and operates to interrupt the electrical circuit when an anomaly occurs in the electrical circuit, a system, or the like in the object, to thereby prevent damage caused by the anomaly from becoming severe. For example, breaker device 1 is mounted on a vehicle, which is one example of the object, and is connected between a motor and a battery (for example, a lithium-ion battery) for driving the motor to interrupt the electrical connection between the motor and the battery for driving the motor at the time of emergency such as an abnormal time or the time of an accident. Note that the object may be other than a vehicle; examples of the object include, but are not limited to, a home appliance and a photovoltaic system.

Igniter 10, which holds gunpowder therein, includes lid portion 11 provided between the gunpowder and pusher 60, is disposed in recess 61, and generates gas. For example, igniter 10 is an electric igniter including: a gunpower portion including an ignition charge; and a conducting pin for passing an electric current through the gunpowder portion. During operation, an operating current for igniting the ignition charge is supplied from an external power supply to the conducting pin, thus the ignition charge is ignited and burnt, and gas (combustion gas) is generated. Note that when recess 61 is formed, breaker device 1 can be reduced in size.

Igniter 10 is fixed to a small-diameter portion 21 located at the top of upper casing 20.

Upper casing 20 and lower casing 30, which are members constituting the outer full of breaker device 1, accommodate a portion of each of igniter 10, resin member 40, and conductor 50, pusher 60, protective portion 80, and elastic members 92, 94, 96. Space 70 extending in the up-down direction is formed inside upper casing 20 and lower casing 30. Space 70 is a space formed in the shape of a circular cylinder so that pusher 60 can move therein. Pusher 60 is housed in an area of space 70 that is located at the upper end (on the positive side of the Z-axis) in the up-down direction (the Z-axis direction).

Each of upper casing 20 and lower casing 30 is formed of a metal such as stainless steel (SUS), but may be formed of other metals such as aluminum. The outer shape of each of upper casing 20 and lower casing 30 is, but not limited to, a circular column. Upper casing 20 and lower casing 30 are fixed using fastening members such as screws and rivets. Each of upper casing 20 and lower casing 30 is one example of the casing.

Upper casing 20, which is a cylinder member having the shape of a circular cylinder with a step, for example, is hollow inside. Upper casing 20 includes: small-diameter portion 21 located in an upper area; large-diameter portion 23 located in a lower area; and connecting portion 22 that connects these small-diameter and large-diameter portions. Small-diameter portion 21 and large-diameter portion 23 are coaxially disposed, and large-diameter portion 23 is larger in diameter than small-diameter portion 21.

Upper casing 20 includes bent portion 24 that contacts elastic member 92. Bent portion 24 is configured to include: a bent part of the casing (for example, a part at the boundary between small-diameter portion 21 and connecting portion 22); and a part of the casing that is located around said bent part (refer to the dashed frame illustrated in FIG. 5). Bent portion 24 includes, as the part of the casing that is located around said bent part, a part of the casing that contacts elastic member 92 and is orthogonal to the up-down direction, and may also include at least a part of connecting portion 22, for example.

In this manner, bent portion 24 is provided so as to press elastic member 92 in an area around the bent part of the casing. Note that large-diameter portion 23 is not included in bent portion 24.

Lower casing 30, which is a member having the shape of a hollow cylinder with a closed bottom, includes protruding portion 30*a* that protrudes upward. Specifically, lower casing 30 includes protruding portion 30*a*, bottom portion 33, and side wall portion 34. Protruding portion 30*a*, bottom portion 33, and side wall portion 34 are integrally formed.

Note that in the present specification, being integrally formed indicates at least one of the following: that components are formed of the same material; that components are formed at the same time; and that components are the same object (a single object), for example.

Protruding portion 30*a* is located below separating portion 51 and configured to protrude upward in space 70. Protruding portion 30*a* is connected to one end of bottom portion 33 and protrudes upward (on the positive side of the Z-axis) from bottom portion 33 in space 70. Protruding portion 30*a* is configured to contact pusher 60 that has moved downward by the gas generated by igniter 10 and then deform downward by being pressed by pusher 60. This means that protruding portion 30*a* has the function of absorbing impact (stress) from pusher 60 by deformation.

Protruding portion 30*a* forming the recess of lower casing 30 is exposed as viewed from the outside of breaker device 1 when breaker device 1 is viewed from the negative side of the Z-axis to the positive side of the Z-axis. In the present exemplary embodiment, protruding portion 30*a* is tapered upward in space 70, but the shape of protruding portion 30*a* is not limited to this tapered shape.

Bottom portion 33 connects protruding portion 30*a* and side wall portion 34. In other words, protruding portion 30*a* and side wall portion 34*a* are connected via bottom portion 33. Bottom portion 33 has an outer surface and an inner surface each inclining upward from protruding portion 30*a* to side wall portion 34.

Side wall portion 34 is connected to the other end of bottom portion 33 and is formed so as to extend upward from bottom portion 33. Side wall portion 34 has the shape of a cylinder; in the present exemplary embodiment, side wall portion 34 has the shape of a circular cylinder. Side wall portion 34 is disposed coaxially with small-diameter portion 21 and large-diameter portion 23. The diameter of side wall portion 34 is equal to the diameter of large-diameter portion 23, for example.

Protruding portion 30*a*, bottom portion 33, and side wall portion 34 have the same thickness in the present exemplary embodiment, but may have different thicknesses, for example.

Resin member 40 is a member that covers a portion of conductor 50. Resin member 40 is a portion of a structural element that forms space 70. Resin member 40 includes embedding portion 41, first cylindrical portion 42, and second cylindrical portion 43.

Embedding portion 41 is a part of resin member 40 in which conductor 50 is embedded. For example, embedding portion 41 is partially exposed from the casing. Embedding portion 41 has a through-hole in which conductor 50 (specifically, holding portion 52) is disposed.

First cylindrical portion 42, which is a part of resin member 40 that is disposed in the casing, is where pusher 60 is disposed during a non-interrupting operation (while no gas is generated by igniter 10). In other words, first cylindrical portion 42 is located between the casing and pusher 60. The inner diameter of first cylindrical portion 42 is smaller than the inner diameter of second cylindrical portion 43. Note that the position of pusher 60 illustrated in FIG. 2 and FIG. 3 indicates the initial position assumed during a non-interrupting operation.

Second cylindrical portion 43, which is a part of resin member 40 that is disposed in the casing, is a part located below first cylindrical portion 42. The inner diameter of second cylindrical portion 43 is larger than the inner diameter of first cylindrical portion 42. Thus, the volume of the lower area of space 70 can be increased. This makes it possible to reduce an increase in the pressure inside the casing that is caused by the gas generated by igniter 10 and the following movement of pusher 60, meaning that the deformation of breaker device 1 can be minimized.

In this manner, pusher 60 moves in space 70 formed by first cylindrical portion 42 and second cylindrical portion 43. Note that first cylindrical portion 42 and second cylindrical portion 43 are not limited to having different inner diameters and may have the same inner diameter.

Conductor 50 is an electrically conductive metal body that is partially located in upper casing 20 and lower casing 30.

When breaker device 1 is mounted on a predetermined electrical circuit, conductor 50 forms a part of said electrical circuit and is also referred to as a busbar. Conductor 50 is a flat member held on resin member 40 and disposed so as to cross the interior of each of upper casing 20 and lower casing 30. Conductor 50 includes separating portion 51 and holding portion 52.

Conductor 50 can be formed of a metal such as copper (Cu), for example. Note that conductor 50 may be formed of a metal other than copper or may be formed of an alloy of copper and another metal. For example, conductor 50 may contain manganese (Mn), nickel (Ni), platinum (Pt), or the like.

Separating portion 51, which is a part of conductor 50 that is cut off by pusher 60 under the pressure of the gas generated by igniter 10, is located below pusher 60 at the initial position.

Holding portion 52 is a part of conductor 50 that is held by resin member 40. Holding portion 52 is a part that does not overlap pusher 60 as viewed from above, but overlaps resin member 40 and is located outside of the casing as viewed from above, for example. Holding portion 52 remains held by resin member 40 even after separating portion 51 is cut off.

Pusher 60 is positioned below igniter 10 and disposed so as to move downward and, for example, when an anomaly occurs in the system, moves downward to cut off conductor 50 and interrupt the flow of an electric current through the electrical circuit as an emergency measure. As just described, pusher 60 is configured to cut off separating portion 51 from conductor 50 under the pressure of the gas generated by igniter 10.

In the present exemplary embodiment, pusher 60 is in the shape of a circular column with a recessed top. A circumferential recess for holding elastic member 92 is not formed on a side surface of pusher 60. As a result, in the present exemplary embodiment, unlike the related art, it is possible to avoid a reduction in the strength of the pusher and a reduction in the insulation performance of the pusher after interruption that are caused by a circumferential recess formed in a side wall of the pusher.

Pusher 60 is formed from an insulating member such as a synthetic resin, for example. In the present exemplary embodiment, pusher 60 is formed from nylon. Pusher 60 has the shape of a circular column with an outer diameter corresponding to the inner diameter of small-diameter portion 21 of upper casing 20. Furthermore, pusher 60 includes recess 61, and igniter 10 is disposed inside recess 61. Note that the shape of pusher 60 is not limited to said shape and can be changed, as appropriate, according to the shape, etc., of each of upper casing 20 and lower casing 30. Recess 61 is an upper portion of pusher 60 where a recess directed downward is provided.

In the example illustrated in FIG. 2, recess 61 is a portion with a lateral surface surrounded by small-diameter portion 21 and connecting portion 22 in the state where breaker device 1 does not perform the interrupting operation (the state illustrated in FIG. 2).

Recess 61 includes: first portion 62 having a diameter (for example, an inner diameter) greater than the diameter of first cylindrical portion 81 of protective portion 80; and second portion 63 located below first portion 62 and having a diameter (for example, an inner diameter) greater than the diameter of second cylindrical portion 82, as viewed from above. The diameter of first portion 62 is greater than the diameter of second portion 63 as viewed from above. For example, in a cross-sectional view, the inner wall of first portion 62 is tapered with a diameter reduced toward second portion 63, but may be, for example, in the shape of a staircase with a diameter reduced stepwise.

Protective portion 80 is a structural element for protecting pusher 60 from being damaged by opening portion 11*a* of igniter 10 (refer to FIG. 5) when igniter 10 generates gas. Specifically, protective portion 80 is a member serving as a barrier to opening portion 11*a* that may open wide, to reduce the occurrence of opening portion 11*a* opened as a result of the gas generation by igniter 10 coming into contact with pusher 60 and damaging recess 61 of pusher 60.

Protective portion 80 is provided on the casing (for example, upper casing 20) or igniter 10 and includes a part located inside recess 61. In the present exemplary embodiment, protective portion 80 is provided on the casing (specifically, small-diameter portion 21). Protective portion 80 is fixed to small-diameter portion 21 by welding, for example, but the fixing method is not limited to welding.

As illustrated in FIG. 3, etc., protective portion 80 includes first cylindrical portion 81 and second cylindrical portion 82. First cylindrical portion 81 and second cylindrical portion 82 are integrally formed.

First cylindrical portion 81, which is a part in the shape of a cylinder surrounding the lateral side of igniter 10, has a shape corresponding to igniter 10. In the present exemplary embodiment, first cylindrical portion 81 is formed in the shape of a staircase (for example, in the form of a two-step staircase), the diameter (for example, the inner diameter) of which is reduced stepwise downward in a cross-sectional view. Note that the shape of first cylindrical portion 81 is not limited to this shape; for example, first cylindrical portion 81 may be tapered with a diameter reduced downward or may have another shape.

First cylindrical portion 81 may be at least partially in contact with igniter 10. Second cylindrical portion 82 is disposed at the lower end of first cylindrical portion 81.

First cylindrical portion 81 includes flange portion 83 at the top. Flange portion 83, which is a ring-shaped part (for example, a plate-shaped member) formed so as to protrude outward from the upper end of first cylindrical portion 81 as viewed from above, is fixed to small-diameter portion 21 by welding or the like. At least a part of flange portion 83 is disposed between first portion 62 and small-diameter portion 21, for example. Thus, first cylindrical portion 81 includes a part connected to the casing and is fixed to the casing.

Second cylindrical portion 82 is a ring-shaped part located below first cylindrical portion 81 and having a diameter (for example, an inner diameter) less than the diameter of first cylindrical portion 81. Second cylindrical portion 82 is a part that protrudes straight from the lower end of first cylindrical portion 81 on the negative side of the Z-axis and when the gas is generated, contacts lid portion 11. The lower end (the end located on the negative side of the Z-axis, that is, the lowest end, for example) of second cylindrical portion 82 is located at a level below (on the negative side of the Z-axis from) the lower end (the end located on the negative side of the Z-axis, that is, the lowest end, for example) of lid portion 11 in the state where no gas is generated.

Protective portion 80 is formed of a metal such as stainless steel (SUS), for example, but may be formed of other metals such as aluminum or may be formed of a resin (for example, a resin different from that of pusher 60).

As illustrated in FIG. 2, etc., resin members 90, 92, 94, 96, which are elastic members such as rubber, are O-rings each formed in a loop-shape (the shape of a ring). Each of elastic members 90, 92, 94, 96 is disposed in the state of being pressed (a deformed state).

Elastic member 90 is disposed in the space formed between small-diameter portion 21, igniter 10, and fixing member 100 for fixing igniter 10 disposed in recess 61. Elastic member 90 is in contact with each of fixing member 100, igniter 10, and small-diameter portion 21 and, for example, is pressed by each of fixing member 100, igniter 10, and small-diameter portion 21.

Elastic member 92 is disposed to be positioned between the casing and pusher 60 in such a manner as to be pressed against the casing and press the outer side surface of pusher 60. Elastic member 92 is disposed so as to extend along the outer side surface of pusher 60. In the present exemplary embodiment, elastic member 92 is disposed in the space formed between the casing (for example, connecting portion 22), pusher 60, and resin member 40 in order to keep the internal space of recess 61 and the space outside of said internal space (for example, the space between pusher 60 and resin member 40) from being spatially connected. Elastic member 92 reduces the leakage of the gas generated by igniter 10 into the space outside of the internal space of recess 61. With this, it is possible to minimize a reduction in the pressure of the gas inside recess 61 that is due to the gas generated by igniter 10 escaping from the internal space of recess 61. Note that the outer side surface in the present specification is a part indicated by a straight line in a cross-sectional view; a surface forming the circumferential recess (groove) is not included in the outer side surface.

In the present exemplary embodiment, elastic member 92 is in contact (for example, surface contact) with the casing (bent portion 24), pusher 60, and resin member 40 and, for example, is pressed by each of the casing (bent portion 24), pusher 60, and resin member 40.

The shape of a cross section of elastic member 92 when pressed is triangular, but is not limited to this shape. The shape of the cross section of elastic member 92 when not pressed is not limited as long as the internal space of recess 61 and conductor 50 can be spatially separated after pressing; said shape may be a circle, may be a polygon (for example, a square), or may be an ellipse.

Note that in the present specification, the meaning of the term "pressing" includes, in addition to a situation where "one member presses the other member," a situation where "with a repulsive force generated as a result of elastic deformation of said other member, said other member presses said one member or another member."

Elastic member 94 is disposed in the space formed above conductor 50, between the casing (for example, large-diameter portion 23) and a circumferential recess formed on resin member 40, in order to keep the exterior space and the space located above conductor 50 from being spatially connected. In the present exemplary embodiment, elastic member 94 is in contact with each of resin member 40 and large-diameter portion 23 and, for example, is pressed by each of resin member 40 and large-diameter portion 23.

Elastic member 96 is disposed in the space formed below conductor 50, between lower casing 30 (for example, side wall portion 34) and a circumferential recess formed on resin member 40, in order to keep the exterior space and the space located below conductor 50 from being spatially connected. In the present exemplary embodiment, elastic member 96 is in contact with each of resin member 40 and side wall portion 34 and, for example, is pressed by each of resin member 40 and side wall portion 34.

Note that elastic members 94, 96 are not limited to being disposed in the circumferential recesses without spacing; spacing may be formed in at least one of the up and down directions.

Figure 4A:
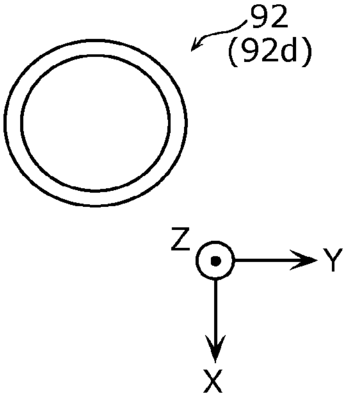
FIG. 4A is a diagram illustrating a first example of the shape of an elastic member included in a breaker device according to an exemplary embodiment as viewed from above.
Figure 4B:
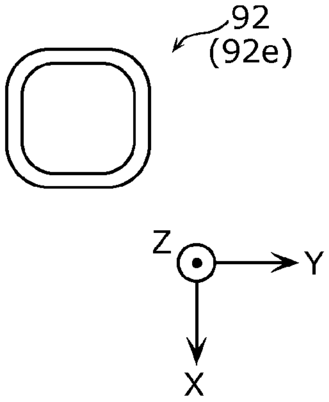
FIG. 4B is a diagram illustrating a second example of the shape of an elastic member included in a breaker device according to an exemplary embodiment as viewed from above.
Figure 4C:
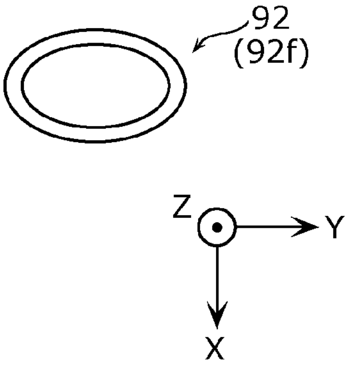
FIG. 4C is a diagram illustrating a third example of the shape of an elastic member included in a breaker device according to an exemplary embodiment as viewed from above.

Next, the shape of elastic member 92 will be described with reference to FIG. 4A to FIG. 4C. FIG. 4A to FIG. 4C are diagrams illustrating examples of the shape of elastic member 92 included in breaker device 1 according to the present exemplary embodiment, as viewed from above. Note that while the shape of elastic member 92 will be described with reference to FIG. 4A to FIG. 4C, the same applies to other elastic members 90, 94, 96.

When pusher 60 is in the shape of a circular column, elastic member 92 (92*d*) may be in the shape of a circular ring, as illustrated in FIG. 4A.

When pusher 60 is in the shape of a square column, elastic member 92 (92*e*) may be in the shape of a rectangular ring, as illustrated in FIG. 4B.

When pusher 60 is in the shape of an elliptical cylinder, elastic member 92 (92*f*) may be in the shape of an elliptical ring, as illustrated in FIG. 4C.

In the present exemplary embodiment, elastic member 92 is in the shape of a circular ring. Thus, elastic member 92 has a shape corresponding to the outer side surface of pusher 60. As a result, no matter what shape pusher 60 has, elastic member 92 can be disposed so as to extend along the outer side surface of pusher 60. Note that the shape of elastic member 92 is not limited to said shape; when pusher 60 has a different shape, elastic member 92 corresponding to the different shape is selected, as appropriate.

1-2. State of Breaker Device after Interrupting Operation

Figure 5:
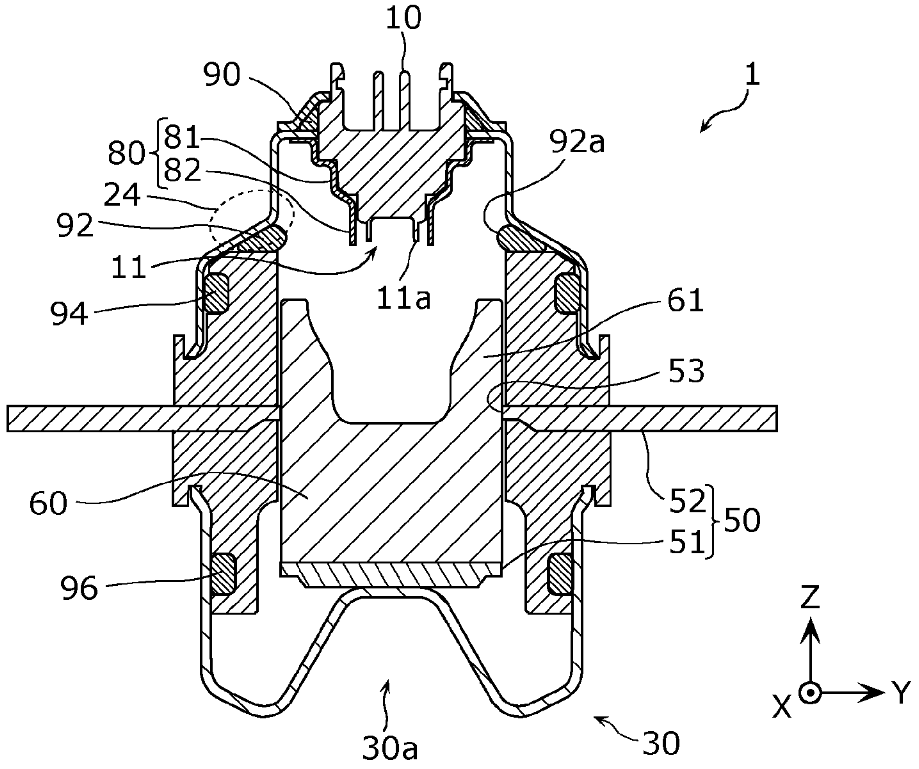
FIG. 5 is a cross-sectional view for describing the state of a breaker device according to an exemplary embodiment after an interrupting operation.

Next, the state of breaker device 1 configured as described above after the interrupting operation will be described with reference to FIG. 5 to FIG. 6B. FIG. 5 is a cross-sectional view for describing the state of breaker device 1 according to the present exemplary embodiment after the interrupting operation. FIG. 5 illustrates a cross section in the state where pusher 60 is stationary after pusher 60 cuts off separating portion 51 under the pressure of the gas generated by igniter 10. Note that for the sake of convenience, FIG. 5 illustrates a state where opening portion 11*a* is open along the Z-axis direction when opening portion 11*a* has reached the lowest position. Therefore, opening portion 11*a* and protective portion 80 are not in contact in FIG. 5, but in actuality, opening portion 11*a* is open in such a manner as to contact second cylindrical portion 82.

First, the interrupting operation of breaker device 1 will be described. When igniter 10 operates, the upper surface (the pressure-receiving surface) of pusher 60 receives the pressure of energy from igniter 10, thus pusher 60 moves downward at high speed from the initial position illustrated in FIG. 3, cuts off separating portion 51 from holding portion 52, and moves further downward at high speed integrally with cut-off separating portion 51, and separating portion 51 comes into contact with protruding portion 30*a*. Thus, pusher 60 can cut conductor 50 forcibly and physically.

Protruding portion 30*a* is pressed by pusher 60 and thus deforms downward. Thus, the impact (stress) from pusher 60 can be absorbed by the deformation of protruding portion 30*a*. Furthermore, even when pusher 60 moves further downward, a part of pusher 60 (for example, at least a part of recess 61) is located at a level above cut surface 53. This allows for an increase in the insulation distance between cut surfaces 53 of conductor 50, meaning that electric arc generation at the time of interruption on conductor 50 can be reduced.

Note that during the interrupting operation, elastic member 92 is stationary and does not move downward together with pusher 60, as illustrated in FIG. 5. Note that elastic member 92 may oscillate in the stationary state during the interruption operation; in the present exemplary embodiment, oscillating can also be regarded as being stationary.

As illustrated in FIG. 5, when pusher 60 is stationary, elastic member 92 is held on the casing and resin member 40 and released from the pressure from pusher 60, and therefore deforms to expand inward while remaining in contact with the casing and resin member 40. This means that elastic member 92 deforms so that an internal portion thereof overlaps pusher 60 as viewed from above. In other words, pusher 60 is located at a level below elastic member 92, and inner surface 92*a* (the inner side surface) of elastic member 92 overlaps pusher 60 as viewed from above. When pusher 60 is stationary, elastic member 92 is held on the casing and therefore does not fall off. When pusher 60 is stationary, elastic member 92 is located at a level above conductor 50 (for example, cut surface 53).

Thus, the portion of elastic member 92 that has expanded inward functions as a stopper that keeps pusher 60 from moving up to the original position, meaning that it is possible to keep conductor 50 from passing an electric current again through separating portion 51 as a result of pusher 60 and separating portion 51 moving up to the original positions. Elastic member 92 is strong enough to withstand the impact (stress) from pusher 60 moving up to the original position.

Note that as illustrated in FIG. 5, pusher 60 does not include a groove or a step extending along the outer periphery of pusher 60, at a level above cut surface 53 of conductor 50 along which separating portion 51 has been cut off. For example, recess 61 of pusher 60 does not include, at a level above cut surface 53, a groove or a step extending along the outer periphery of pusher 60. The term "groove" herein refers to a depression with one step, and the term "step" herein refers to a depression with two or more steps. The groove or the step indicated herein is a groove or a step that is formed continuously on the outer periphery of pusher 60 at least halfway around the perimeter. Specifically, the groove or the step indicated herein is a groove or a step via which cut surfaces 53 at opposite ends are not spatially connected even when pusher 60 in the state illustrated in FIG. 5 rotates around the Z axis as an axis of rotation.

Figure 6A:
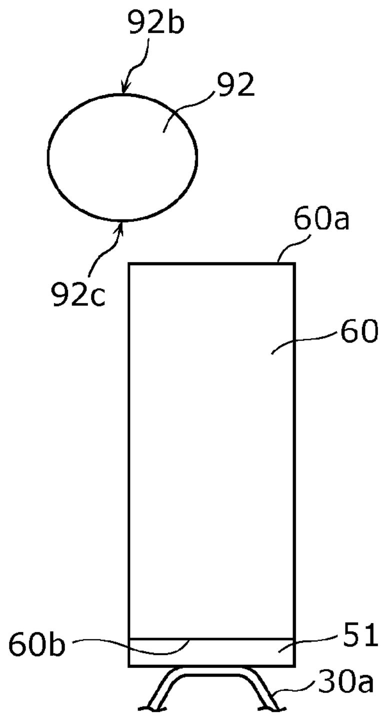
FIG. 6A is a diagram illustrating one example of the positional relationship between an elastic member and a pusher in a breaker device according to an exemplary embodiment after an interrupting operation.

Next, the positional relationship between elastic member 92 and pusher 60 after the interrupting operation will be described with reference to FIG. 6A and FIG. 6B. FIG. 6A and FIG. 6B are diagrams illustrating examples of the positional relationship between elastic member 92 and pusher 60 after the interruption operation of breaker device 1 according to the present exemplary embodiment. FIG. 6A and FIG. 6B schematically illustrate the positional relationship between elastic member 92 and pusher 60 in the state where pusher 60 is stationary (in the stationary state) after pusher 60 cuts off separating portion 51 under the pressure of the gas generated by igniter 10. Note that FIG. 6A and FIG. 6B are schematic diagrams in which elastic member 92 is shown as an ellipse and pusher 60 is shown as a rectangle.

Figure 6B:
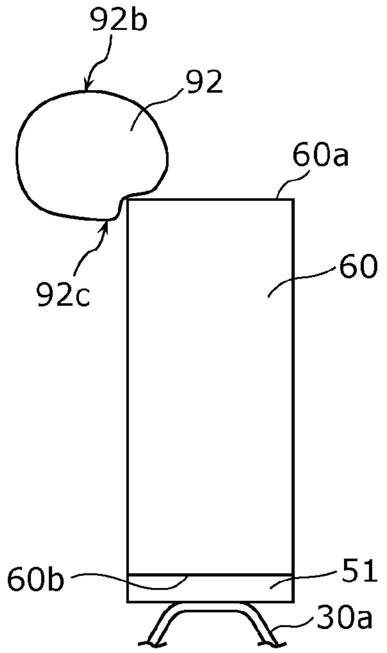
FIG. 6B is a diagram illustrating another example of the positional relationship between an elastic member and a pusher in a breaker device according to an exemplary embodiment after an interrupting operation.

As illustrated in FIG. 6A and FIG. 6B, in the stationary state, upper end 60*a* (which is a portion located at the top, for example, the upper surface) of pusher 60 is located at a level below upper end 92*b* (which is a portion located at the top) of elastic member 92, and lower end 60*b* (which is a portion located at the bottom, for example, the lower surface) of pusher 60 is located at a level below lower end 92*c* (which is a portion located at the bottom) of elastic member 92.

As illustrated in FIG. 6A, in the stationary state, upper end 60*a* of pusher 60 may be located at a level below lower end 92*c* of elastic member 92. In other words, in the stationary state, pusher 60 and elastic member 92 are arranged in the up-down direction with spacing therebetween and do not need to be in contact with each other. In this case, for example, the distance between the upper end of protruding portion 30*a* and lower end 92*c* of elastic member 92 in the Z-axis direction is greater than the total thickness of pusher 60 and separating portion 51 in the Z-axis direction.

In such a case, when pusher 60 moves upward by the impact of collision of separating portion 51 with protruding portion 30*a* or when pusher 60 moves upward by the oscillation, etc., of a vehicle after the stationary state, upper end 60*a* of pusher 60 contacts elastic member 92, and thus pusher 60 is kept from moving upward. This means that elastic member 92 serves as a barrier to pusher 60 moving upward.

As illustrated in FIG. 6B, in the stationary state, upper end 60*a* of pusher 60 may be located between upper end 92*b* and lower end 92*c* of elastic member 92. This means that in the stationary state, pusher 60 and elastic member 92 may be in contact with each other. In this case, for example, the distance between the upper end of protruding portion 30*a* and lower end 92*c* of elastic member 92 in the Z-axis direction is less than the total thickness of pusher 60 and separating portion 51 in the Z-axis direction, and the distance between the upper end of protruding portion 30*a* and upper end 92*b* of elastic member 92 in the Z-axis direction is greater than the total thickness of pusher 60 and separating portion 51 in the Z-axis direction.

As just described, in the stationary state, even when pusher 60 is located midway along elastic member 92 in the up-down direction (even when pusher 60 is in contact with elastic member 92), an upper portion of elastic member 92 expands inward, and therefore pusher 60 and elastic member 92 partially overlap as viewed from above, and the portion of elastic member 92 that has expanded inward contacts pusher 60 moving up to the original position and thus functions as a stopper that keeps pusher 60 from moving up to the original position.

VARIOUS VARIATIONS OF EXEMPLARY EMBODIMENT

Hereinafter, various variations applicable to the exemplary embodiment will be described with reference to FIG. 7 to FIG. 9. Note that the following description will focus on differences from the exemplary embodiment, and description of details that are the same as or similar to those described in the exemplary embodiment will be omitted or simplified.

Variation 1 of Exemplary Embodiment

Figure 7:
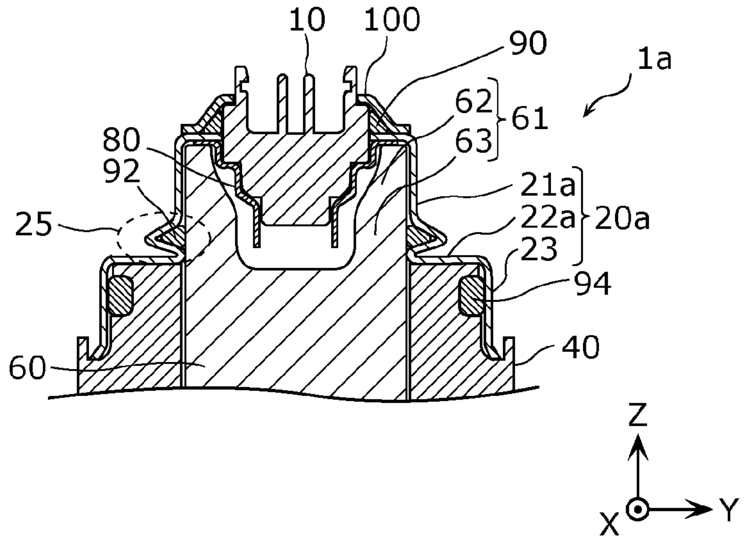
FIG. 7 is a cross-sectional view illustrating a breaker device according to Variation 1 of an exemplary embodiment.

FIG. 7 is a cross-sectional view illustrating breaker device 1*a* according to the present variation. With reference to FIG. 7, the first different example of the bent portion included in the casing will be described.

As illustrated in FIG. 7, breaker device 1*a* includes upper casing 20*a* instead of upper casing 20 of breaker device 1 according to the exemplary embodiment.

Upper casing 20*a* includes: small-diameter portion 21*a* located in an upper area; large-diameter portion 23 located in a lower area; and connecting portion 22*a* that connects these small-diameter and large-diameter portions. Small-diameter portion 21*a* includes bet portion 25 (refer to the dashed frame illustrated in FIG. 7) including: a part protruding outward along the periphery; and a part of the casing that is located around said protruding part. Protruding outward means protruding from the inside of breaker device 1*a* to the outside of breaker device 1*a* as breaker device 1*a* is viewed from above. Bent portion 25 is formed at the time of molding of upper casing 20*a*.

Connecting portion 22*a* extends in the Y-axis direction and connects small-diameter portion 21*a* (for example, bent portion 25) and large-diameter portion 23.

As viewed from above, bent portion 25 overlaps a part of connecting portion 22*a*. For example, bent portion 25 does not protrude further outward than large-diameter portion 23 as viewed from above.

Elastic member 92 is disposed to be positioned between bent portion 25 of the casing and pusher 60 (for example, recess 61) in such a manner as to be pressed against bent portion 25 and press the outer side surface of pusher 60. Elastic member 92 is disposed in the space formed between bent portion 25 and pusher 60. In the present variation, elastic member 92 is in contact with the casing (bent portion 25) and pusher 60 and, for example, is pressed by each of the casing (bent portion 25) and pusher 60. In other words, elastic member 92 is not in contact with resin member 40, and is not pressed by resin member 40. Note that the shape of a cross section of elastic member 92 when pressed is triangular, for example, but is not limited to this shape.

Variation 2 of Exemplary Embodiment

Figure 8:
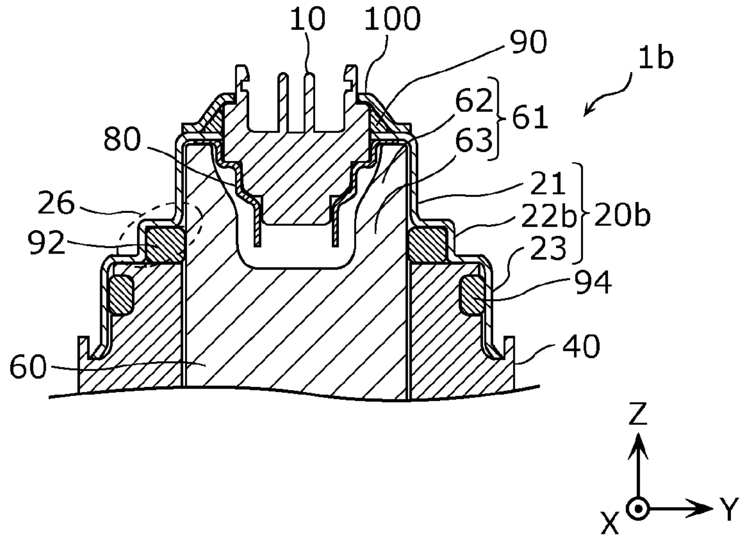
FIG. 8 is a cross-sectional view illustrating a breaker device according to Variation 2 of an exemplary embodiment.

FIG. 8 is a cross-sectional view illustrating breaker device 1*b* according to the present variation. With reference to FIG. 8, the second different example of the bent portion included in the casing will be described.

As illustrated in FIG. 8, breaker device 1*b* includes upper casing 20*b* instead of upper casing 20 of breaker device 1 according to the exemplary embodiment.

Upper casing 20*b* includes: small-diameter portion 21 located in an upper area; large-diameter portion 23 located in a lower area; and connecting portion 22*b* that connects these small-diameter and large-diameter portions.

Connecting portion 22*b* is formed in the shape of a staircase and connects small-diameter portion 21 and large-diameter portion 23. Connecting portion 22*b* incudes one step in the example illustrated in FIG. 8, but may include two or more steps.

Upper casing 20*b* includes bent portion 26 formed in the shape of a staircase along the periphery. Bent portion 26 includes at least a part of connecting portion 22*b* (refer to the dashed frame illustrated in FIG. 8). Bent portion 26 includes a part bent from the lower end of small-diameter portion 21 in a direction (the Y-axis direction in the example illustrated in FIG. 8) orthogonal to a direction (the Z-axis direction) in which small-diameter portion 21 extends. Bent portion 26 is formed at the time of molding of upper casing 20*b*.

Elastic member 92 is disposed to be positioned between bent portion 26 of the casing and pusher 60 (for example, recess 61) in such a manner as to be pressed against bent portion 26 and press the outer side surface of pusher 60. Elastic member 92 is disposed in the space formed between bent portion 26, pusher 60, and resin member 40. In the present variation, elastic member 92 is in contact with the casing (bent portion 26), pusher 60, and resin member 40 and, for example, is pressed by each of the casing (bent portion 26), pusher 60, and resin member 40.

Note that the shape of a cross section of elastic member 92 when pressed is rectangular, for example, but is not limited to this shape. In the present variation, elastic member 92 does not need to be in contact with resin member 40.

Variation 3 of Exemplary Embodiment

Figure 9:
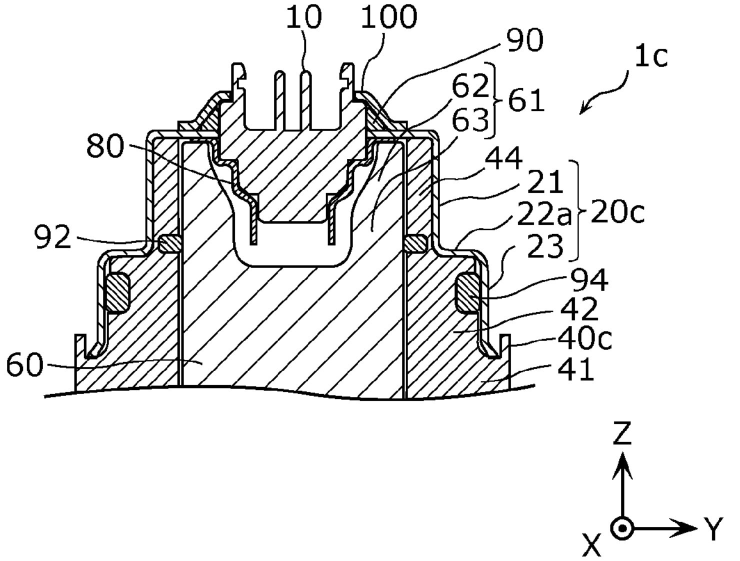
FIG. 9 is a cross-sectional view illustrating a breaker device according to Variation 3 of an exemplary embodiment.

FIG. 9 is a cross-sectional view illustrating breaker device 1*c* according to the present variation. With reference to FIG. 9, another example of how to hold elastic member 92 will be described.

As illustrated in FIG. 9, breaker device 1*c* includes upper casing 20*c* instead of upper casing 20 of breaker device 1 according to the exemplary embodiment and includes resin member 40*c* instead of resin member 40 of breaker device 1 according to the exemplary embodiment.

Upper casing 20*c* includes: small-diameter portion 21 located in an upper area; large-diameter portion 23 located in a lower area; and connecting portion 22*a* extending in the Y-axis direction and connecting these small-diameter and large-diameter portions.

Resin member 40*c* includes third cylindrical portion 44 in addition to resin member 40 according to the exemplary embodiment.

Third cylindrical portion 44, which is a part of resin member 40*c* that is disposed in the casing, is where recess 61 of pusher 60 is disposed during a non-interrupting operation (while no gas is generated by igniter 10). In other words, third cylindrical portion 44 is located between the casing (for example, small-diameter portion 21) and pusher 60. Third cylindrical portion 44 is a part located above first cylindrical portion 42, and the inner diameter of third cylindrical portion 44 is equal to that of first cylindrical portion 42. In other words, the inner surface of third cylindrical portion 44 and the inner surface of first cylindrical portion 42 are flush with each other.

Elastic member 92 is disposed in the space formed between pusher 60 and a circumferential recess formed on the inner surface of third cylindrical portion 44 of resin member 40*c*. In the present exemplary embodiment, elastic member 92 is in contact with each of resin member 40*c* (third cylindrical portion 44) and pusher 60 (recess 61) and, for example, is pressed by each of resin member 40*c* and pusher 60.

In breaker device 1*c* according to the present variation, resin member 40*c* is disposed between the casing and elastic member 92, and thus elastic member 92 is not in contact with the casing, and the casing is configured to press elastic member 92 via resin member 40*c* (third cylindrical portion 44). Such elastic member 92 is one example of the elastic member provided so as to be pressed against the casing and press the outer side surface of pusher 60.

In the present variation, elastic member 92 after movement of pusher 60 is held on resin member 40*c* and therefore does not fall off.

Configuration of Another Breaker Device

Figure 11:
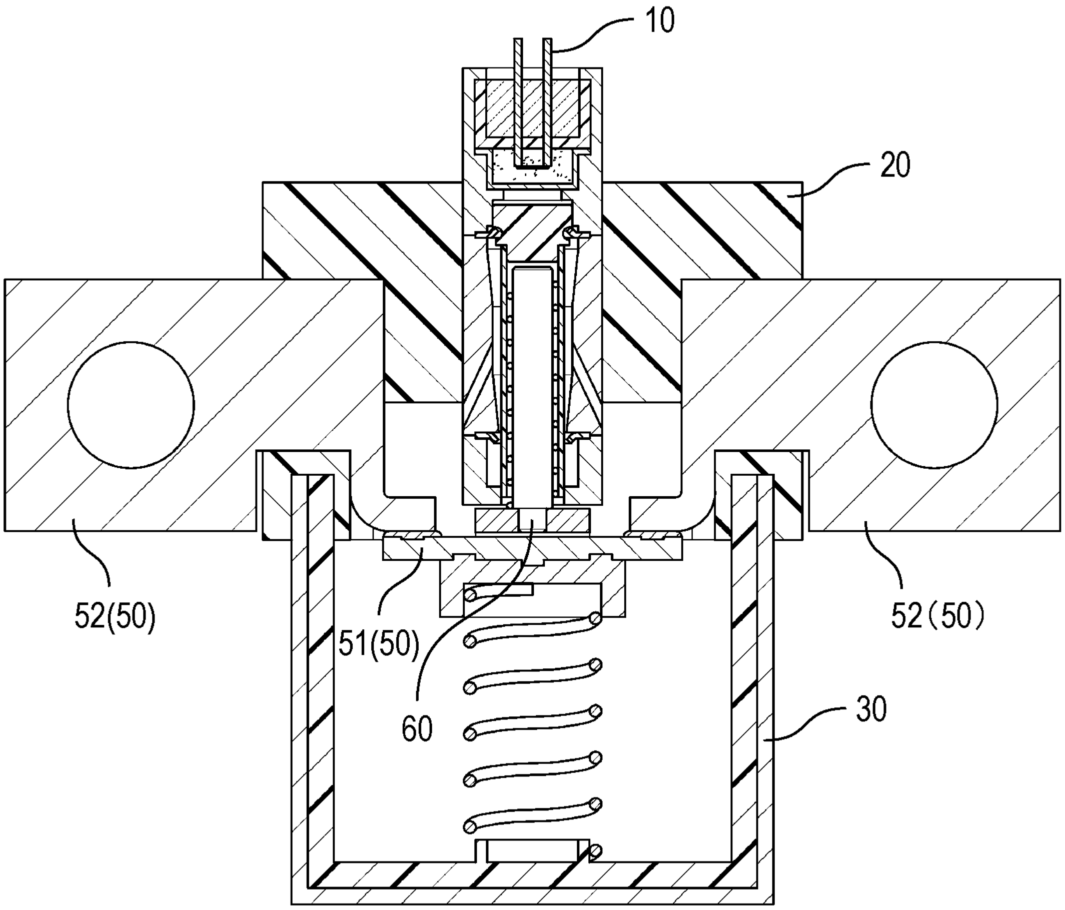
FIG. 11 is a cross-sectional view illustrating a breaker device according to another exemplary embodiment.
Figure 12:
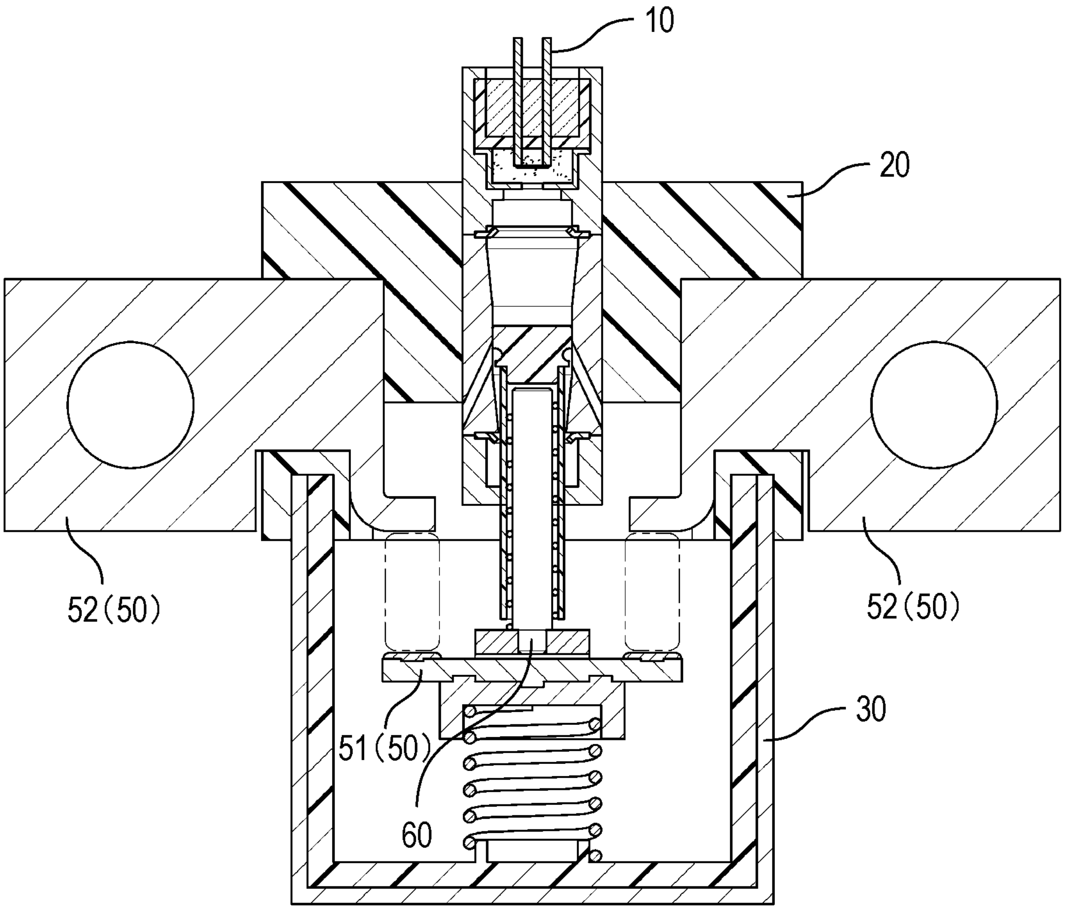
FIG. 12 is a cross-sectional view for describing the state of a breaker device according to another exemplary embodiment with a separating portion having moved downward.

A breaker device in which separating portion 51 has a different structure will be described with reference to FIG. 11 and FIG. 12. FIG. 11 is a cross-sectional view illustrating a breaker device according to another exemplary embodiment. FIG. 12 is a cross-sectional view for describing the state of the breaker device according to another exemplary embodiment illustrated in FIG. 11 with a separating portion having moved downward.

Note that in FIG. 11 and FIG. 12, elements that are substantially the same as those in breaker device 1 described above will be assigned the same reference signs, and description thereof will be omitted.

In breaker device 1 described above, pusher 60 cuts off separating portion 51 from conductor 50 under the pressure of the gas generated by igniter 10, and thus separating portion 51 moves downward. In other words, when separating portion 51 is cut off from holding portion 52, the electrical connection between separating portion 51 and holding portion 52 is cut off and as a result, conductor 50 becomes non-conducting. However, the breaker device according to the present disclosure does not necessarily need to be configured to cut off separating portion 51.

For example, as illustrated in FIG. 11 and FIG. 12, pusher 60 may move the separating portion downward under the pressure of the gas generated by igniter 10 and thereby place conductor 50 in a non-conducting state. In other words, separating portion 51 in contact with holding portion 52 may be moved downward so that separating portion 51 is separated from holding portion 52, to place conductor 50 in a non-conducting state.

Manufacturing Method

Figure 10:
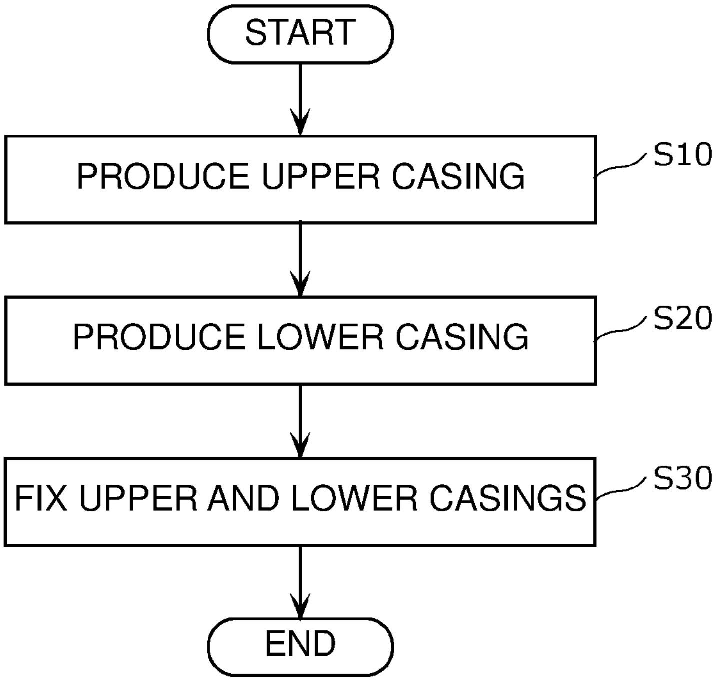
FIG. 10 is a flowchart illustrating a manufacturing process of a breaker device according to an exemplary embodiment, etc.

Next, a method for manufacturing the breaker device according to the exemplary embodiment, etc., configured as described above will be described with reference to FIG. 10. FIG. 10 is a flowchart illustrating a manufacturing process of breaker device 1 according to Embodiment 1. While FIG. 10 illustrates the manufacturing process of breaker device 1 according to Embodiment 1, the same applies to breaker devices 1*a* to 1*c* according to other variations.

As indicated in FIG. 10, upper casing 20 is produced by molding or the like (S10), and lower casing 30 is produced by molding or the like (S20). Note that Step S10 may be performed after Step S20.

In Step S10, protective portion 80 is further provided on upper casing 20. For example, protective portion 80 is fixed to upper casing 20 by welding or the like. Furthermore, in Step S20, protruding portion 30*a* is formed at the same time as lower casing 30 is produced by molding.

Next, upper casing 20 and lower casing 30 are fixed (S30). For example, upper casing 20 and lower casing 30 are fixed without spacing using fastening members or the like in the state where igniter 10, resin member 40, conductor 50, pusher 60, protective portion 80, and elastic members 90, 92, 94, 96 are housed in these casings. At this time, elastic member 92 is disposed in the space formed by the casing, resin member 40, and pusher 60. Thus, breaker device 1 described above is produced.

Other Exemplary Embodiments

The breaker devices according to one or more aspects have been described thus far on the basis of the exemplary embodiment, etc., but the present disclosure is not limited to the exemplary embodiment, etc. Various modifications to the present exemplary embodiment and forms configured by combining structural elements in different exemplary embodiments that can be conceived by those skilled in the art may be included within the present disclosure as long as these do not depart from the essence of the present disclosure.

For example, the above exemplary embodiment, etc., describes an example in which the casing is made of a metal, but this is not limiting; for example, the lower casing included in the casing may be made of a resin with deformation properties.

The order of the steps in the method for manufacturing the breaker device described in the above exemplary embodiment, etc., may be changed. Furthermore, the steps in the method for manufacturing the breaker device described in the above exemplary embodiment may be performed in a single step or may be performed in separate steps. Note that the phrase “the steps are performed in a single step” is intended to include a situation in which the steps are performed using a single device, a situation in which the steps are sequentially performed, and a situation in which the steps are performed at the same location. The term “separate steps” is intended to include a situation in which the steps are performed using separate devices, a situation in which the steps are performed at different times (for example, on different days), and a situation in which the steps are performed at different locations.

INDUSTRIAL APPLICABILITY

The present disclosure is useful in breaker devices, etc., that are disposed in an electrical circuit.

REFERENCE SIGNS LIST

1, 1*a*, 1*b*, 1*c* breaker device
10 igniter
11 lid portion
20, 20*a*, 20*b*, 20*c* upper casing
21, 21*a* small-diameter portion
22, 22*a*, 22*b* connecting portion
23 large-diameter portion
24, 25, 26 bent portion
30 lower casing
30 protruding portion
33 bottom portion
34 side wall portion
40, 40*c* resin member
41 embedding portion
42, 81 first cylindrical portion
43, 82 second cylindrical portion
44 third cylindrical portion
50 conductor
51 separating portion
52 holding portion
53 cut surface
60 pusher
60*a*, 92*b* upper end
60*b*, 92*c* lower end
61 recess
62 first portion
63 second portion
70 space
80 protective portion
83 flange portion
90, 92, 92*d*, 92*e*, 92*f*, 94, 96 elastic member
92*a* inner surface

The invention claimed is:

1. A breaker device comprising:

a casing;

an igniter configured to generate gas;

a pusher located inside the casing, positioned below the igniter and having an outer side surface;

a conductor including a separating portion positioned below the pusher; and an elastic member having an inner surface and disposed to be positioned between the casing and the pusher to press the outer side surface of the pusher, wherein:

in a state where the pusher is stationary after the pusher moves the separating portion downward under a pressure of the gas generated by the igniter, the pusher is located at a level below the elastic member, and the inner surface of the elastic member overlaps the pusher as viewed from above.

2. The breaker device according to claim 1, wherein in a state where the pusher is stationary after the pusher cuts off the separating portion under the pressure of the gas generated by the igniter, an upper end of the pusher is located at a level below an upper end of the elastic member, and a lower end of the pusher is located at a level below a lower end of the elastic member.

3. The breaker device according to claim 2, wherein in the state where the pusher is stationary after the pusher cuts off the separating portion under the pressure of the gas generated by the igniter, the upper end of the pusher is located at a level below the lower end of the elastic member.

4. The breaker device according to claim 1, further comprising:

a resin member located inside the casing and positioned between the casing and the pusher, wherein the elastic member is in contact with the casing, the pusher, and the resin member.

5. The breaker device according to claim 1, further comprising:

a resin member located inside the casing and positioned between the casing and the pusher, wherein the elastic member is pressed against the casing, the pusher, and the resin member.

6. The breaker device according to claim 4, wherein in a state where the pusher is stationary after the pusher cuts off the separating portion under the pressure of the gas generated by the igniter, the elastic member is held on the casing and the resin member.

7. The breaker device according to claim 1, wherein the casing includes a bent portion, and the bent portion is in contact with the elastic member.

8. The breaker device according to claim 1, wherein in a state where the pusher is stationary after the pusher cuts off the separating portion under the pressure of the gas generated by the igniter, the pusher includes no groove or step extending along an outer periphery of the pusher, at a level above a surface of the conductor along which the separating portion has been cut off.

9. The breaker device according to claim 1, wherein a side wall of the pusher contacts the elastic member and includes no groove extending along an outer periphery of the pusher.

10. The breaker device according to claim 1, wherein the elastic member is ring-shaped.

11. The breaker device according to claim 1, wherein the elastic member is disposed along the outer side surface of the pusher.

12. The breaker device according to claim 1, wherein the elastic member is disposed to be pressed against the casing.

13. The breaker device according to claim 1, wherein under the pressure of the gas generated by the igniter, the pusher cuts off the separating portion and moves the separating portion downward.

14. The breaker device according to claim 7, wherein the elastic member is disposed along the outer side surface of the pusher.

* * * * *